US008335920B2

(12) United States Patent
Jevans

(10) Patent No.: US 8,335,920 B2
(45) Date of Patent: Dec. 18, 2012

(54) RECOVERY OF DATA ACCESS FOR A LOCKED SECURE STORAGE DEVICE

(75) Inventor: David Alexander Jevans, Los Altos, CA (US)

(73) Assignee: Imation Corp., Oakdale, MN (US)

( * ) Notice: Subject to any disclaimer, the term of this patent is extended or adjusted under 35 U.S.C. 154(b) by 666 days.

(21) Appl. No.: 11/765,424

(22) Filed: Jun. 19, 2007

(65) Prior Publication Data

US 2007/0300052 A1    Dec. 27, 2007

Related U.S. Application Data

(60) Provisional application No. 60/752,310, filed on Jun. 19, 2006.

(51) Int. Cl.
H04L 29/06    (2006.01)
G06F 3/00    (2006.01)
G06F 12/00    (2006.01)

(52) U.S. Cl. .............................. 713/163; 710/1; 710/100

(58) Field of Classification Search .................. 713/163; 710/1, 100
See application file for complete search history.

(56) References Cited

U.S. PATENT DOCUMENTS

| | | | |
|---|---|---|---|
| 4,578,530 A * | 3/1986 | Zeidler ........................... 705/71 |
| 5,010,571 A | 4/1991 | Katznelson | |
| 5,341,339 A | 8/1994 | Wells | |
| 5,404,485 A | 4/1995 | Ban | |
| 5,479,638 A | 12/1995 | Assar et al. | |
| 5,857,021 A * | 1/1999 | Kataoka et al. .................. 705/54 |
| 5,937,425 A | 8/1999 | Ban | |
| 6,032,227 A | 2/2000 | Shaheen et al. | |
| 6,092,196 A | 7/2000 | Reiche | |
| 6,118,874 A | 9/2000 | Okamoto et al. | |
| 6,223,284 B1 | 4/2001 | Novoa | |
| 6,292,899 B1 * | 9/2001 | McBride ......................... 726/22 |
| 6,731,536 B1 | 5/2004 | McClain | |
| 6,763,468 B2 | 7/2004 | Gupta et al. | |
| 6,776,332 B2 | 8/2004 | Allen et al. | |
| 6,791,877 B2 | 9/2004 | Miura et al. | |
| 6,834,795 B1 | 12/2004 | Rasmussen et al. | |
| 6,920,527 B2 | 7/2005 | Cloutier et al. | |
| 6,961,852 B2 | 11/2005 | Craft | |
| 6,987,927 B1 | 1/2006 | Battaglia et al. | |

(Continued)

FOREIGN PATENT DOCUMENTS

WO    02/47081 A2    6/2002

OTHER PUBLICATIONS

U.S. Appl. No. 11/486,799, David Jevans, Secure Storage Device with Offline Code Entry, filed Jul. 14, 2006.

(Continued)

*Primary Examiner* — Techane Gergiso
(74) *Attorney, Agent, or Firm* — Kenneth E. Levitt; Dorsey & Whitney LLP

(57) ABSTRACT

A system for recovery of data access of a locked secure storage device can comprise a keystore module and an authorization module. The keystore module may be configured to allow access to a master file system comprising a user encryption key for data stored within the locked secure storage device based on a master code. The authorization module may be configured to receive the administrator code, authenticate the administrator code, decode the master code, and reset a lockout parameter of the locked secure storage device.

28 Claims, 7 Drawing Sheets

U.S. PATENT DOCUMENTS

| | | | |
|---|---|---|---|
| 6,993,661 | B1 | 1/2006 | Garfinkel |
| 7,266,699 | B2 | 9/2007 | Newman et al. |
| 7,272,723 | B1 | 9/2007 | Abbott et al. |
| 7,275,139 | B1 | 9/2007 | Tormasov et al. |
| 7,278,025 | B2 | 10/2007 | Saito et al. |
| 7,360,091 | B2 * | 4/2008 | Aikawa et al. ............... 713/172 |
| 7,412,420 | B2 | 8/2008 | Holdsworth |
| 7,475,425 | B2 | 1/2009 | Bantz et al. |
| 7,478,248 | B2 * | 1/2009 | Ziv et al. ...................... 713/193 |
| 7,631,191 | B2 | 12/2009 | Glazer et al. |
| 7,685,425 | B1 | 3/2010 | Wright et al. |
| 7,698,442 | B1 | 4/2010 | Krishnamurthy et al. |
| 7,757,088 | B2 | 7/2010 | Abdulhayoglu |
| 8,015,606 | B1 | 9/2011 | Jevans et al. |
| 2001/0045451 | A1 | 11/2001 | Tan et al. |
| 2002/0029215 | A1 | 3/2002 | Whitmyer, Jr. |
| 2002/0046342 | A1 * | 4/2002 | Elteto et al. .................. 713/185 |
| 2003/0005336 | A1 * | 1/2003 | Poo et al. ...................... 713/202 |
| 2003/0041253 | A1 * | 2/2003 | Matsui et al. ................. 713/189 |
| 2003/0149670 | A1 | 8/2003 | Cronce |
| 2003/0149854 | A1 | 8/2003 | Yoshino et al. |
| 2003/0182584 | A1 | 9/2003 | Banes |
| 2003/0204735 | A1 | 10/2003 | Schnitzmeier |
| 2003/0204754 | A1 | 10/2003 | Cromer et al. |
| 2003/0215090 | A1 * | 11/2003 | Saito et al. .................... 380/201 |
| 2004/0059925 | A1 | 3/2004 | Benhammou et al. |
| 2004/0073797 | A1 * | 4/2004 | Fascenda ...................... 713/171 |
| 2004/0103288 | A1 | 5/2004 | Ziv et al. |
| 2004/0103325 | A1 | 5/2004 | Priebatsch |
| 2004/0123113 | A1 * | 6/2004 | Mathiassen et al. .......... 713/185 |
| 2004/0146015 | A1 * | 7/2004 | Cross et al. ................... 370/328 |
| 2004/0148333 | A1 | 7/2004 | Manion et al. |
| 2004/0177258 | A1 | 9/2004 | Ong |
| 2004/0188710 | A1 | 9/2004 | Koren et al. |
| 2005/0015540 | A1 | 1/2005 | Tsai et al. |
| 2005/0020315 | A1 | 1/2005 | Robertson |
| 2005/0044377 | A1 | 2/2005 | Huang |
| 2005/0055519 | A1 | 3/2005 | Stuart et al. |
| 2005/0182973 | A1 | 8/2005 | Funahaski et al. |
| 2006/0016875 | A1 * | 1/2006 | Bonalle et al. ................ 235/380 |
| 2006/0021059 | A1 | 1/2006 | Brown et al. |
| 2006/0041932 | A1 | 2/2006 | Cromer et al. |
| 2006/0047717 | A1 | 3/2006 | Pereira |
| 2006/0069840 | A1 | 3/2006 | Corbett et al. |
| 2006/0095688 | A1 | 5/2006 | Kawamura et al. |
| 2006/0117393 | A1 | 6/2006 | Merry et al. |
| 2006/0129830 | A1 * | 6/2006 | Haller et al. ................... 713/183 |
| 2006/0143476 | A1 | 6/2006 | McGovern |
| 2006/0179309 | A1 * | 8/2006 | Cross et al. ................... 713/168 |
| 2006/0208066 | A1 * | 9/2006 | Finn et al. ..................... 235/380 |
| 2006/0224742 | A1 | 10/2006 | Shahbazi |
| 2006/0236363 | A1 | 10/2006 | Heard et al. |
| 2007/0016743 | A1 | 1/2007 | Jevans |
| 2007/0016756 | A1 | 1/2007 | Hsieh et al. |
| 2007/0028033 | A1 | 2/2007 | Hsieh et al. |
| 2007/0033330 | A1 | 2/2007 | Sinclair et al. |
| 2007/0038802 | A1 | 2/2007 | Tsai et al. |
| 2007/0056043 | A1 | 3/2007 | Onyon et al. |
| 2007/0067620 | A1 | 3/2007 | Jevans |
| 2007/0101434 | A1 | 5/2007 | Jevans |
| 2007/0118898 | A1 | 5/2007 | Morgan et al. |
| 2007/0143530 | A1 | 6/2007 | Rudelic et al. |
| 2007/0143532 | A1 * | 6/2007 | Gorobets et al. .............. 711/103 |
| 2007/0180509 | A1 * | 8/2007 | Swartz et al. ...................... 726/9 |
| 2007/0250919 | A1 | 10/2007 | Shull et al. |
| 2007/0266421 | A1 | 11/2007 | Vaidya et al. |
| 2007/0300031 | A1 | 12/2007 | Jevans et al. |
| 2007/0300052 | A1 | 12/2007 | Jevans |
| 2008/0005561 | A1 | 1/2008 | Brown et al. |
| 2009/0222117 | A1 | 9/2009 | Kaplan et al. |

OTHER PUBLICATIONS

U.S. Appl. No. 11/523,968, David Jevans, Recovery of Encrypted Data from a Secure Storage Device, filed Sep. 19, 2006.

U.S. Appl. No. 11/634,763, David Jevans, Storage Device with Website Trust Indication, filed Dec. 5, 2006.

U.S. Appl. No. 11/644,051, David Jevans, Detachable Storage Device with Ram Cache, filed Dec. 21, 2006.

U.S. Appl. No. 11/517,129, David Jevans, Systems and Methods for Third-Party Authentication, filed Sep. 6, 2006.

U.S. Appl. No. 11/644,089, David Jevans, Storage Device with Accessible Partitions, filed Dec. 21, 2006.

U.S. Appl. No. 11/827,258, David Jevans, Memory Data Shredder, filed Jul. 10, 2007.

Denning, Dorothy E. et al. "A Taxonomy for Key Escrow Encryption Systems," *Communications of the ACM*, vol. 39, No. 3, pp. 34-40 (Mar. 1996).

National Institute of Standards and Technology. "Federal Information Processing Standards Publication 197." Nov. 2001.

Kingston. "Kingston Data Traveler Elite: Advanced Security and High Performance." Oct. 2004. http://www.kingstom.com/digitalmedia/dt_elite.wp.pdf.

Army Regulation 380-19. "Information Systems Security." Feb. 27, 1998. Department of the Army. Appendix F. pp. 28-30.

Sedaghat et al. "A Dynamic Web Agent for Verifying the Security and Integrity of a Web Site's Contents," IEEE, Aug. 2002.

Tal, Arie. "Two Technologies Compared: NOR v. NAND", White Paper, 01-SR-012-04-8L, Rev. 1.1, Jul. 2003, pp. 1-14.

Gutmann, Peter. "Secure Deletion of Data from Magnetic and Solid-State Memory." USENIX. Sixth USENIX Security Symposium Proceedings, San Jose, California, Jul. 1996. http://www.cs.auckland.ac.nz/~pgut001/pubs/secure_del.html.

Fischer, Viktor et al. "True Random Number Generator Embedded in Reconfigurable Hardware." Springer-Verlag. Lecture Notes in Computer Science. vol. 2523, pp. 415-430. 2003.

* cited by examiner

RECOVERY OF DATA ACCESS FOR A LOCKED SECURE STORAGE DEVICE

CROSS-REFERENCE TO RELATED APPLICATIONS

The present application claims benefit of priority to U.S. provisional patent Ser. No. 60/815,419 filed Jun. 22, 2006, entitled "Password Protection and Secure Password Unlocking Mechanism".

This application is related to U.S. application Ser. No. 11/523,968, filed Sep. 19, 2006, entitled "Recovery of Encrypted Data from a Secure Storage Device", which claims benefit to U.S. provisional patent Ser. No. 60/718,272, filed Sep. 19, 2005, entitled "Computer Device Encryption Key and Data Recovery Mechanism," and is a continuation-in-part of U.S. nonprovisional application Ser. No. 11/486,799, filed Jul. 14, 2006, entitled "Secure Storage Device with Offline Code Entry," which claims the benefit of U.S. provisional patent Ser. No. 60/698,899, filed Jul. 14, 2005, entitled "Secure Storage Device with Offline Password Entry," all of which are incorporated by reference herein.

BACKGROUND

1. Field of the Invention

The present invention relates generally to data storage, and more particularly to recovery of data access.

2. Background Art

As data processing becomes ubiquitous, users are increasingly demanding that data be both mobile and secure. Although networks, such as the Internet, can transmit data from one computer to another, users often must identify and transmit the data they need to the proper destination. Unfortunately, the data may fail to be transmitted due to firewalls, proxies, spam blockers, size limitations, technical error, or human error. Further, it is not always practical for users to guess what data is needed at a future time and the location of the need. The data is also often routed through unsecure servers or network devices which can intercept the data and further compromise security.

As a result of these problems, users often load data on USB memory devices (e.g., a memory stick) and carry data with them. Unfortunately, USB memory devices can be stolen and accessed by thieves. Some USB memory devices have passwords which must be entered on the host computer before accessing the stored data. However, the password can be cracked (e.g., a brute force attack) and the data accessed.

Some USB memory devices lock the stored data after a predetermined number of password attempts have been made to prevent data theft. Unfortunately, the lock is often easy to reset. Further, the attacker can make a copy of the data stored in the USB memory device, enter the predetermined number of password attempts, delete the data, recopy the data, and enter new password attempts. This process can be repeated until successful thereby inevitably accessing the data.

It is not uncommon for a single master password or backdoor to be installed within a USB memory device to allow a corporate officer (e.g., the CIO) access to an employee's data stored within the USB memory device. Unfortunately, a single master password may be compromised which may provide access to all or most of the USB memory devices. Further, third-parties may provide the single master password or backdoor for the USB memory device. As a result, the number of people with access to the USB memory device may grow thereby reducing the device's security.

SUMMARY OF THE INVENTION

An exemplary system for recovery of data access of a locked secure storage device can comprise a keystore module and an authorization module. The keystore module may be configured to allow access to a master file system comprising a user encryption key for data stored within the locked secure storage device based on a master code. The authorization module may be configured to receive the administrator code, authenticate the administrator code, decode the master code, and reset a lockout parameter of the locked secure storage device. The authorization module may be further configured to receive a user code and decrypt the user encryption key using the user code.

The locked secure storage device can comprise a locked detachable secure storage device such as a USB storage device. The locked secure storage device may comprise a master file system. In one example, the master file system may be contained within the keystore module (e.g., a file system) within the locked secure storage device.

Authenticating the administrator code may comprise the authorization module configured to detect an administrator secure storage device and/or verify the administrator code. Resetting the lockout parameter may comprise the authorization module configured to reset a number of user code attempts, to receive a new user code, to provide a user encryption key, or to provide a master encryption key. The user encryption key may be encrypted by a user code, a hash of the user code, or an administrator encryption key.

An exemplary method for recovery of data access of a locked secure storage device may comprise receiving an administrator code, authenticating the administrator code, decoding a master code, providing access to a master file system comprising a user encryption key for data stored within the locked secure storage device based on the master code, and resetting a lockout parameter of the locked secure storage device.

An exemplary computer readable medium may have embodied thereon a program. The program is executable by a processor for performing a method for recovery of data access of a locked secure storage device. The method may comprise receiving an administrator code, authenticating the administrator code, decoding a master code, providing access to a master file system comprising a user encryption key for data stored within the locked secure storage device based on the master code, and resetting a lockout parameter of the locked secure storage device.

DETAILED DESCRIPTION

Figure 1:
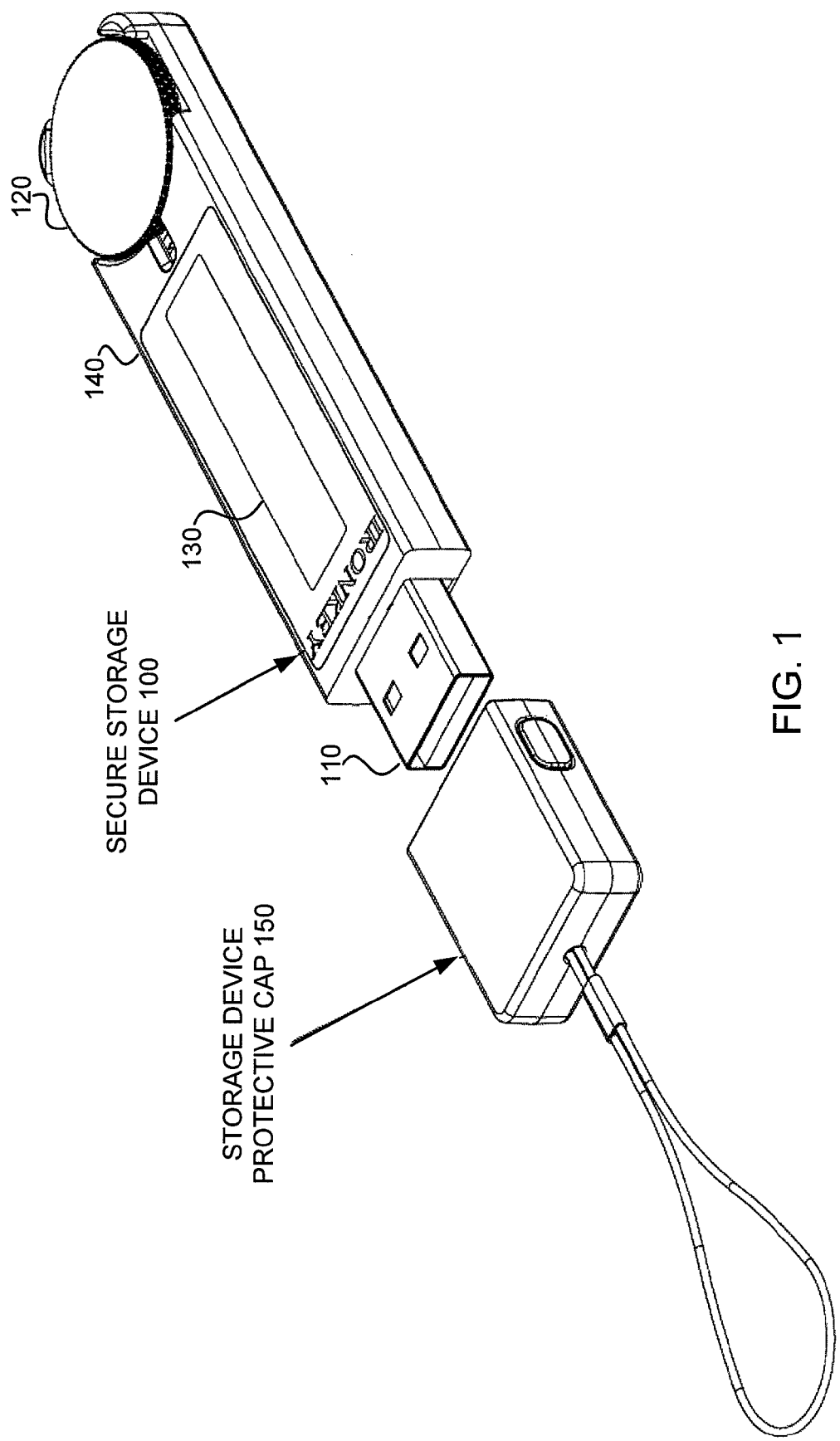
FIG. 1 depicts a secure storage device, in accordance with one embodiment of the present invention.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A secure storage device can be used to securely store, port, and access encrypted data. A secure storage device is any portable memory device that stores encrypted data. Examples of secure storage devices include, but are not limited to, USB memory devices, flash memory devices, NAND memory devices, and portable hard drives.

A secure storage device can be a detachable storage device. A detachable storage device is any storage device (e.g., a USB storage device) that stores encrypted data and is designed to be operatively coupled with a digital device. A digital device is any device with a processor capable of sending or receiving data (e.g., a computer, laptop, personal digital assistant, and cell phone).

A user code and user encryption key may be used to access and decrypt the encrypted data within the secure storage device. In one example, the user may enter the user code into the secure storage device. Once the user code is authenticated, a master code is retrieved and decoded to provide access to the master file system. The master file system may comprise the user encryption key as well as file systems for the data stored on the secure storage device. The user encryption key may then be used to encrypt data to be stored on the secure storage device as well as to decrypt data to be retrieved from the secure storage device.

In order for the secure storage device to be secure, the secure storage device may lock if the secure storage device receives the incorrect user code a predetermined number of times (e.g., the secure storage device will lock upon receiving the incorrect user code ten times consecutively). When the secure storage device is locked, the secure storage device will no longer accept the user code to allow access or allow the stored encrypted data to be decrypted.

In exemplary embodiments, an administrator or other authorized user may enter an administrator code into a device or a server (e.g., third-person website). If the administrator code is authenticated (and/or verified), a user encryption key is provided. Further, a lockout parameter may be reset. An example of resetting a lockout parameter includes, but is not limited to, changing the number of user code attempts (e.g., to zero) thereby unlocking the device. An unlocked secure storage device will receive and attempt to authenticate the user code.

In one example, the administrator enters an administrator code into the secure storage device. The administrator code is authenticated which unlocks an administrator file system within the secure storage device. The administrator may then unlock the secure storage device and/or change the user code. The user encryption key stored within the secure storage device may decrypt data in one or more partitions stored within the secure storage device. The user encryption key may be encrypted by the user code or a hash of the user code.

In another example, the administrator couples the locked secure storage device and an administrator secure storage device with a digital device. The administrator then provides the administrator code to an authentication server over a network. The authentication server may detect and verify the administrator secure storage device and then authenticate the administrator code. The authentication server may then provide a user code or user encryption key to the administrator. The administrator may transmit commands to unlock the locked secure storage device, reset a lockout parameter, or enter a new user code.

Referring to FIG. 1, a secure storage device 100 in accordance with one embodiment of the present invention is shown. The secure storage device 100 comprises a USB connector 110 coupled to a storage device housing 140. A user can turn a user input dial 120 to enter the user code into the secure storage device 100. In various embodiments, an optional display 130 (discussed further herein) may display characters or text to the user. The display 130 may display information to the user indicating that the user code is correct or incorrect.

In some embodiments, the display 130 and/or an optional authorization indicator (not depicted) indicates when the user code has been accepted and access to the stored data on the secure storage device 100 has been authorized. The authorization indicator may be a light emitting diode (LED), a speaker, or any other device that can indicate that access to the stored data has been authorized.

In one example, a user carries stored data within the secure storage device 100. Prior to plugging the secure storage device 100 into a digital device's USB port, the user enters the user code into the secure storage device 100 by turning the user input dial 120 to enter the user code. After the correct user code has been entered, the display 130 can illuminate or otherwise indicate that access to the stored data has been authorized. The user may then proceed to couple the secure storage device 100 with the digital device to access the stored data.

If the user fails to enter the correct user code but couples the secure storage device 100 with the digital device, the digital device may fail to recognize the secure storage device 100, fail to mount the digital media within the secure storage device 100, fail to execute the device driver for the secure storage device 100, and/or be unable to access the stored data.

The user may operate the user input dial 120 to input the user code and/or operate a menu displayed on the display 130. In some embodiments, the user may operate the user input dial 120 in a manner similar to a blackberry jog dial.

The display 130 is any screen that may display information. In some embodiments, the display 130 is a LCD display. The display 130 may display information indicating that access to the stored data (or a partition) is authorized, that the device is locked, that the user code is incorrect, or that another code (e.g., administrator code) is incorrect. In various embodiments, the display 130 can display the name of any applications that are resident on the secure storage device 100.

The USB connector 110 can be coupled to any USB port of the digital device. Although a USB connector 110 is depicted in FIG. 1, the secure storage device 100 is not limited to a USB type connector. In some embodiments, the secure storage device 100 can be coupled to the digital device through a firewire port, Ethernet connector, serial port, parallel port, SCSI port, or ATA connector. Further, the secure storage device 100 can operationally couple wirelessly to the digital device over 802.11 a/b/g/n standards, Bluetooth, or wireless USB. It is apparent to those skilled in the art that the secure storage device 100 can be operationally coupled to the digital device in many ways.

In various embodiments, the secure storage device 100 can be physically or wirelessly coupled to the digital device but the connection is not operational until the user code is entered into the secure storage device 100. In one example, the secure storage device 100 comprises the USB connector 110 coupled to the digital device. Until the user code is entered into the secure storage device 100, the digital device may not recognize the secure storage device 100, load the device driver for the secure storage device 100, or mount the media contained within the secure storage device 100.

The storage device housing 140 may contain any type of data storage medium (e.g., computer readable storage medium) or storage system as well as a power source. The data storage medium (not depicted) may comprise flash memory (e.g., NAND flash or NOR flash memory), a hard drive, ram disk, or any other kind of data storage. A storage system (further described in FIG. 7) can comprise the data storage medium.

The storage device housing 140 may also contain any type of ram cache (not depicted). Dynamic random access memory or any other kind of random access memory may comprise the ram cache. Data (e.g., files) may be stored within the ram cache. Storage of data within the ram cache may accelerate the access of the data files and reduce the number of times data is stored to the storage system which may extend the life of the data storage medium of the storage system.

The secure storage device 100 may comprise a power source (not depicted). The power source can be a rechargeable battery, a replaceable battery (e.g., AA), or a capacitor. In some embodiments, the battery or capacitor can be recharged by the digital device through the USB connector 110 (or any connector that couples the secure storage device 100 to the digital device).

Although the user code input is facilitated by the user input dial 120 in FIG. 1, it is apparent to those skilled in the art that the user code can be input into the secure storage device 100 in many ways. In one example, the secure storage device 100 comprises a keypad with which the user can press keys to enter the user code. In another example, the secure storage device 100 comprises a biometric sensor which can receive the voice, fingerprint, or retina scan of the user as the user code. The secure storage device 100 can also comprise a radial knob input, a user input dial, and a code indicator which may be used by a user to input the user code.

The optional authorization indicator displays an indicator when the user code has been accepted and that access to the stored data is authorized. The authorization indicator can comprise a light emitting diode (LED) that emits a light to indicate that the user code has been accepted. In some embodiments, the authorization indicator can generate a colored light to indicate user code acceptance (e.g., green) and another colored light to indicate that the user code has been rejected (e.g., red). The authorization indicator may comprise multiple LEDs to indicate user code acceptance, rejection, or lockout of the secure storage device 100. In other embodiments, a sound may be generated by the secure storage device 100 to indicate that the user code has been accepted or rejected.

A lockout (e.g., the secure storage device 100 is locked) may be triggered if one or more incorrect user codes are received. An authorization lockout locks the secure storage device 100 so that the secure storage device 100 will refuse to accept one or more user codes until one or more lockout parameters are reset. In one example, the secure storage device 100 has received multiple incorrect user codes. As a result, the secure storage device 100 may refuse to receive or allow access to one or more user codes (e.g., the secure storage device 100 refuses to receive any user codes thereby locking the device.) In exemplary embodiments, the locked secure storage device 100 may allow limited or full access to an administrator code. This process if further discussed in FIGS. 3-6.

A storage device protective cap 150 may be coupled to the secure storage device 100. The storage device protective cap 150 may protect the USB connector 110. In some embodiments, the storage device protective cap 150 may lock to the secure storage device 100. The storage device protective cap 150 may be automatically unlocked when the user enters the correct user name or password into the secure storage device 100.

Figure 2:
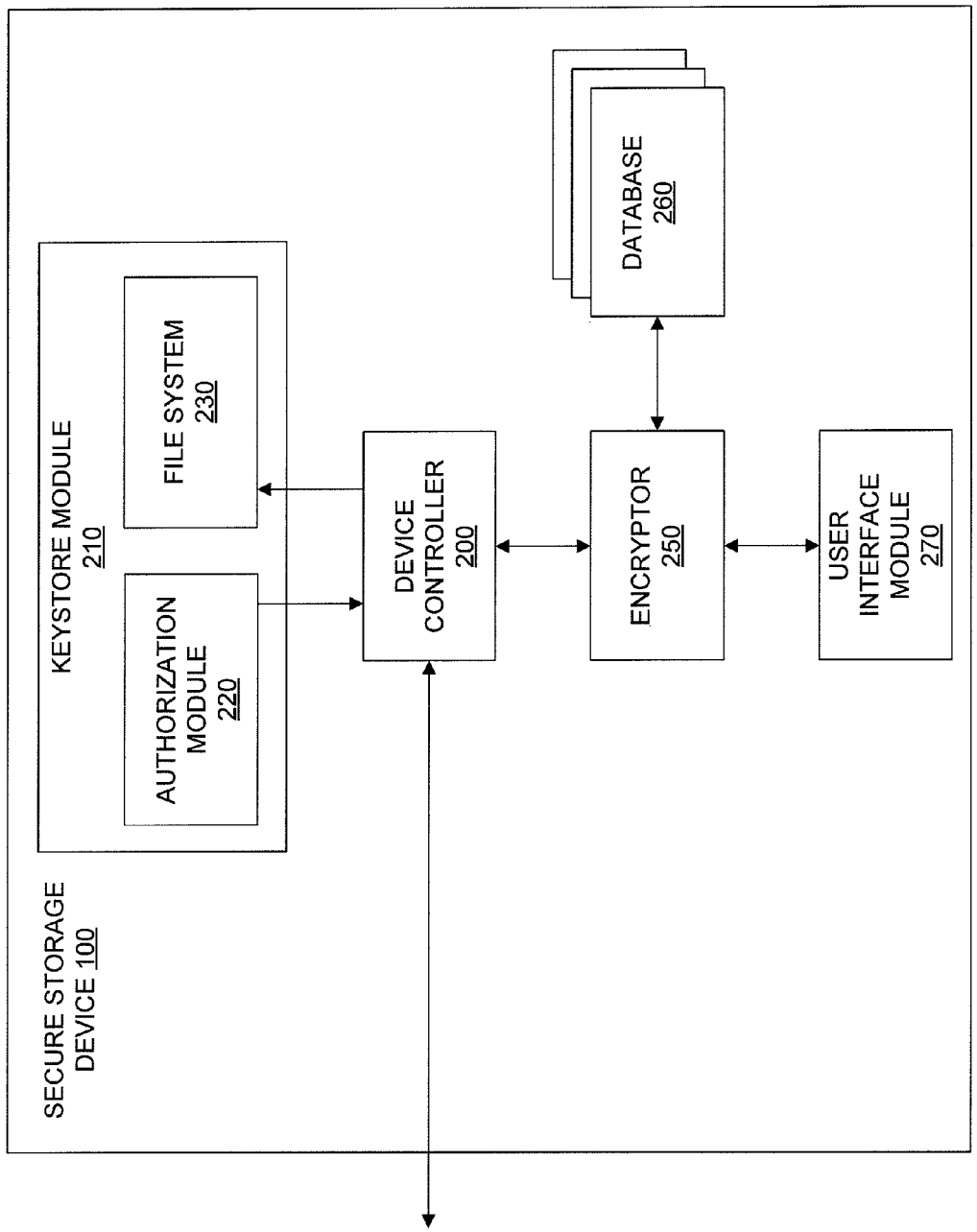
FIG. 2 depicts a block diagram of a secure storage device, in accordance with one embodiment of the present invention.

FIG. 2 is a block diagram of a secure storage device 100, in accordance with one embodiment of the present invention. The secure storage device 100 comprises a device controller 200 coupled to the keystore module 210. The keystore module 210 comprises an authorization module 220 and a file system 230. The device controller 200 is further coupled to an encryptor 250 which is further coupled to database 260, a user interface module 270, and a storage module 280.

The device controller 200 can comprise the device driver for the secure storage device 100. The device controller 200 controls the communication with the digital device (not depicted) as well as the operations within the secure storage device 100. In some embodiments, the device controller 200 can control a processor or circuitry within the secure storage device 100.

In various embodiments, the device controller 200 receives an identification query from a digital device requesting the type of device of the secure storage device 100. If authorized, the device controller 200 can respond by transmitting a signal to the digital device identifying the secure storage device 100 and allowing any digital media (e.g., data storage medium configured in one or more partitions) to be mounted within the operating system of the digital device. If not authorized, the device controller 200 may refuse to respond or reject the digital device's attempts to mount the digital media.

In other embodiments, the device controller 200 receives the identification query from the digital device and identifies the secure storage device 100 as a compact disc (CD). The digital device may then attempt to automatically run an authorization check program from the device controller 200. This feature is similar to automatically playing the first song on an audio CD upon loading of the CD. The authorization check program can determine if access to the stored data is authorized. If access to stored data is not authorized, the authorization check program may terminate or the transmission of data between the digital device and the secure storage device 100 may terminate. Further, the device controller 200 may refuse to allow the digital device access to the database 260 and/or refuse to allow the digital media to be mounted.

The device controller 200 may also control the optional authorization indicator or display 130 (FIG. 1) based on an authorization indicator signal from the authorization module 220. In one example, if access to the stored data is authorized, the device controller 200 may send a signal to the authorization indicator to illuminate an LED or generate a sound to indicate that access to the stored data is authorized. The device controller 200 can also generate a signal to trigger a display on the display 130 or generate a sound to indicate that authorization is denied or that the secure storage device 100 is locked.

The keystore module 210 authorizes access to the stored data within the database 260. The keystore module 210 comprises the authorization module 220 and optionally a file system 230. In some embodiments, the keystore module 210 also comprises one or more authentication codes (e.g., user codes and administrator codes) to authorize access to the stored data. In other embodiments, the one or more authentication passwords are within the file system 230. An authentication code is a password, code, or key retained the secure storage device 100 configured to allow access to at least one file system within the file system 230.

In exemplary embodiments, the keystore module 210 comprises a master file system with access to one or more other file systems on the secure storage device 100. In one example, the master file system comprises all other file systems on the secure storage device 100 including the file system(s) for the database 260. The master file system may be contained within the file system 230. In various embodiments, the master file system comprises the encryption keys used to encrypt data stored on the secure storage device 100 (e.g., the user encryption key discussed further herein.)

The authorization module 220 receives the user code or the administrator code (discussed herein) and determines if the user or code or administrator code is authorized or authentic to access the stored data. If user code or the administrator code is authenticated and/or authorized, the authorization module 220 decodes the master code to access the master file system. The encryption keys and user file system may then be accessed.

In one example, the authorization module 220 decrypts an encryption key with a user code (or administrator code). If the decrypted authentication code is correct, then the user may be authorized to access the stored data. If the user is authorized to access the stored data, the authorization module 220 may transmit an authorization signal to the device controller 200 to authorize access. If the user is not authorized, the authorization module 220 may refuse to respond to subsequent attempts to access the data (e.g., locking the secure storage device 100).

In another embodiment, the authorization module 220 may decrypt the encryption key with the user code or the administrator code. If the user code or administrator code is correct, the appropriate encryption key will be decrypted, thereby allowing the encryption key to decrypt data stored within the secure storage device 100 (e.g., within the database 260). If the user code or the administrator code is incorrect, the data within the secure storage device 100 may not be decrypted. Further, the device controller 200 or the authorization module 220 may lock the secure storage device 100.

The keystore module 210 may maintain a list of one or more authentication codes and one or more file systems. In various embodiments, different file systems can associate each authentication code with a different partition within the digital media. As a result, separate user codes may access different partitions within the data storage medium. In one example, a first user code entered by a user may authorize access to a partition with data used at the user's home. A second user code may authorize access to a partition with business data. As a result, a single secure storage device 100 may be shared with co-workers or others which may be allowed to access some, but not all, of the stored data retained within the secure storage device 100. In other embodiments, the file system 230 can maintain a list of one or more user codes associated with the different partitions within the data storage medium.

In some embodiments, the keystore module 210 comprises the file system 230 which comprises the master file system, one or more of the file systems and/or user encryption keys. Each file system may be associated with one or more user encryption keys configured to decrypt data from the database 260 and encrypt data to be stored within the database 260.

In various embodiments, the file system is a map of the stored data retained within the database 260. Without the file system, the digital device may not be able to identify stored data contained within the database 260. By separating the file system from the database 260, a thief who removes the database 260 from the secure storage device 100 may fail to steal the file system.

The file system(s), including the master file system, may be scrambled or encrypted. The authorization module 220 can unscramble or decrypt the file system within the file system 230 or the database 260 when access to the stored data is authorized. In one example, an encryption key is configured to decrypt the file system 230 or the database file system within the file system 230. The encryption key itself may be encrypted. In another example, the master code or a corresponding master encryption key is configured to decrypt the master file system, the file system 230, or the database file system within the file system 230.

In various embodiments, the file system 230 comprises an administrator file system. The administrator file system may allow access to all other file systems within the file system 230. In one example, the administrator file system comprises the user encryption keys to unlock the file system for a user. As a result, once the administrator provides the administrator code, the administrator may have access to the user encryption key. However, the user encryption key may be encrypted by a user code, a hash of the user code, an administrator code, or any other code.

The encryptor 250 functions to encrypt or decrypt security codes, stored data within the database 260, or the file system 230. In exemplary embodiments, the stored data within the database 260 is encrypted. If access to stored data or a partition is authorized, the encryptor 250 encrypts data transmitted from the digital device prior to storage within the database 260. Further, as stored data is requested from the database 260, the encryptor 250 can decrypt the stored data prior to transmission of the stored data to the digital device. As a result, the stored data within the database 260 may always be encrypted.

The encryptor 250 can also decrypt the user encryption code or a separate security code using the user code prior to authorization. When the user encryption code or security code is decrypted, the user encryption code or security code may be sent to the authorization module 220 where it may be compared to the one or more authentication codes within the keystore module 210. In some embodiments, the database 260 and the keystore module 210 are retained on separate chips within the secure storage device 100.

In exemplary embodiments, the encryption keys are stored within the file system 230. Once the authorization module 220 authenticates the user code, administrator code or security code, the appropriate encryption key may be provided to the encryptor 250. In one example, a business user provides a user code that is authenticated. The file system 230 may provide the encryptor 250 a business encryption key configured to decrypt data from or encrypt data to be stored to one or more partitions within the database 260.

The database 260 may comprise one more databases or other data structures of stored data, as well as the encrypted data. The database 260 may be contained within a storage system. The storage system is further discussed in FIG. 7.

The user interface module 270 controls the user interface (e.g., the user input dial 120 in FIG. 1) and receives the user code. In exemplary embodiments, the user interface module 270 receives the user code from the user. In some embodiments, the user interface module 270 sends the user code to the encryptor 250 to decrypt the user code. In other embodiments, the user interface module 270 sends the user code to the encryptor 250 to decrypt a security code. Alternately, the user interface module 270 may provide the user code directly to the authorization module 220 for authentication.

Figure 3:
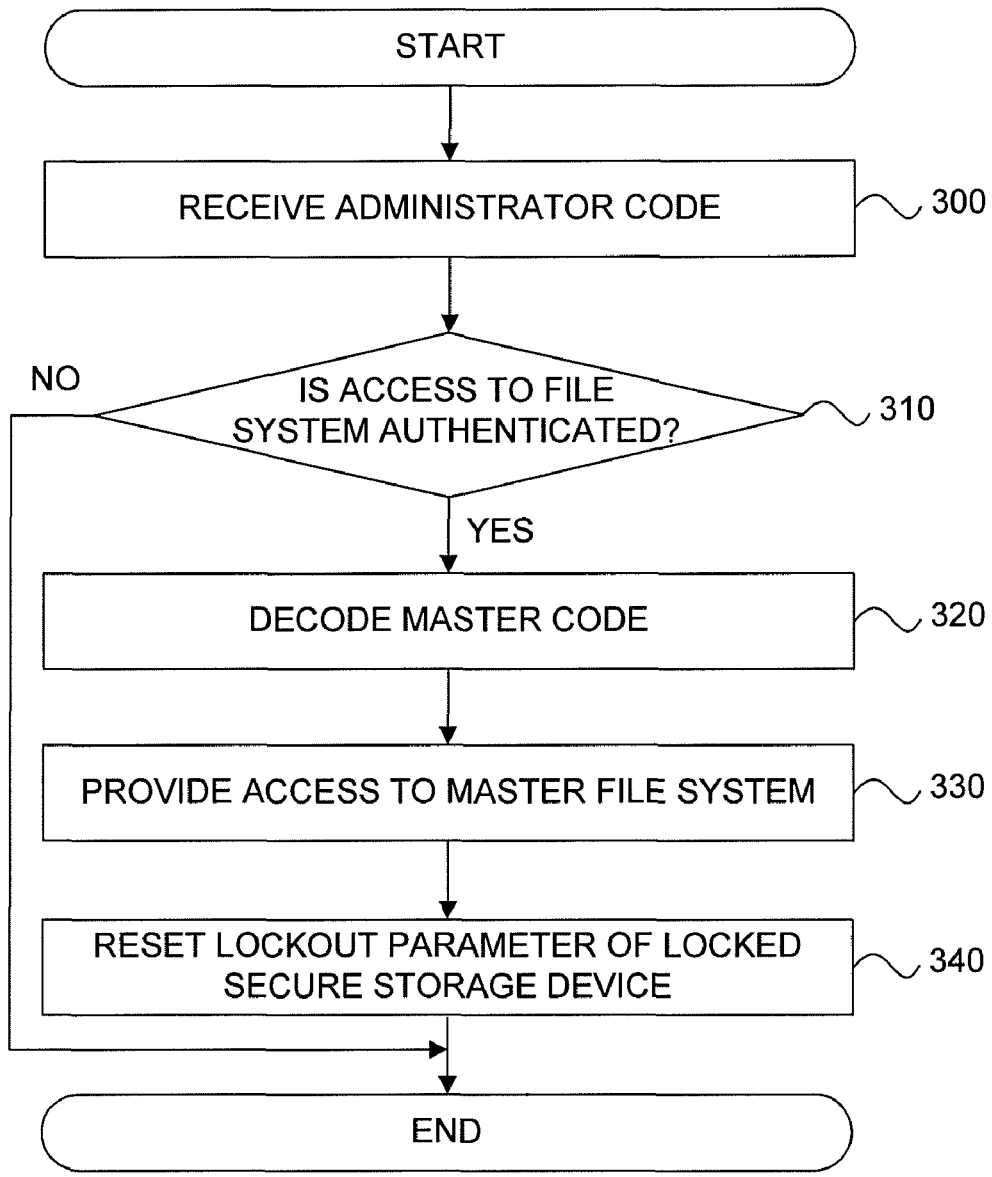
FIG. 3 is a flow chart for the recovery of data access for a locked secure storage device, in accordance with one embodiment of the present invention.

FIG. 3 is a flow chart for the recovery of data access for a locked secure storage device 100, in accordance with one embodiment of the present invention. When a secure storage device 100 is locked, the device no longer accepts one or more user codes. As a result, a user may not longer access encrypted data stored in the secure storage device 100 or store data within the secure storage device 100.

To gain access to the locked secure storage device 100, an administrator may enter an administrator code into the locked secure storage device 100 to gain access to the user encryption key and/or reset a lockout parameter of the locked secure storage device 100. An administrator is any individual, user, or device that can provide the administrator code to the locked secure storage device 100.

In one example, an administrator comprises software within a digital device may be configured to provide an administrator code (e.g., that is encrypted and unknown by the user) to the coupled locked secure storage device 100. The administrator code is any code or password comprising characters, numbers, or a combination of characters and numbers to access one or more file systems within the file system 230 contained within the locked secure storage device 100.

In step 300, the locked secure storage device 100 receives an administrator code. The administrator code may be input directly into the locked secure storage device 100 over the user input dial 120, radial knob input, or other user input. In other embodiments, the administrator may couple the locked secure storage device 100 with a digital device and enter the administrator code into the secure storage device 100 over the digital device.

In step 310, the authorization module 220 determines if access to a file system within the file system 230 is authenticated. In one example, the keystore module 210 (e.g., the authorization module 220 or the file system 230) comprises one or more trusted codes (i.e., administrator and user codes that are considered authentic). When an administrator code is received, the authorization module 220 may compare the received administrator code against a trusted code to authenticate the administrator code. The trusted code may be previously installed within the locked secure storage device 100 by the user or administrator. Alternately, the trusted code may be previously installed within the secure storage device 100 during provisioning or upon manufacture.

In various embodiments, the administrator code is encrypted or digitally signed. The authorization module 220 may decrypts and authenticates the administrator code. The administrator code may also comprise an encrypted file which may be decrypted and authenticated. An encryption key to decrypt the encrypted file or administrator code may be provided by the administrator or may be resident within the keystore module 210. In some embodiments, this encryption key is previously stored within the keystore module 210 by the administrator. Alternately, the encryption key may be previously stored within the keystore module 210 during manufacture or provisioning. The encryption key may then be provided to the administrator.

If the administrator code is not authenticated (i.e., the administrator code is incorrect), the administrator code is rejected and the secure storage device 100 remains locked. In exemplary embodiments, the authorization module 220 may limit the number of consecutive attempts to submit an administrator code to the secure storage device 100. If a maximum number of consecutive attempts are made, the secure storage device 100 may lock out the administrator code which may render the locked secure storage device 100 inaccessible.

In step 320, if the authorization module 220 authenticates the administrator code, the authorization module 220 retrieves and decodes the master code to access the master file system. In various embodiments, the master code never leaves the locked secure storage device 100 thereby providing additional security. The master file system may comprise all other file systems including the user file system which is the file system for data stored by the user. The master file system may also comprise the user encryption keys that are used to encrypt data stored within the locked secure storage device 100.

In one example, once the authorization module 220 authenticates the administrator code, the authorization module decodes the master code without providing the master code to the user or administrator. Once the master code is decoded, the authorization module 220 can access the master file system. Access to the master file system may give the administrator access to one or more user encryption keys, one or more file systems, and the data stored within the locked secure storage device 100.

In some embodiments the master code is encrypted by a master encryption key. In one example, the master encryption key can only be accessed after the authorization module 220 authenticates the administrator code or the user code.

In step 330, authorization module 220 approves access to master file system within the file system 230 based on the decoded master code. In some embodiments, approval of the administrator code provides access to an administrator file system. The administrator file system is a file system within the file system 320 that comprises one or more user encryption keys and/or access to one or more other file systems.

In some embodiments, the user file system comprises a user encryption key. The user encryption key is the encryption key which may decrypt data previously stored in the locked secure storage device 100 by the user. The user encryption key may be, itself, encrypted. In one example, the user encryption key is encrypted by the user code. If the administrator does not have access to the user code (e.g., the user is an employee who left the company or the user forgot the user code), then the encrypted user encryption key may not provide access to data stored within the locked secure storage device 100. In another example, the user encryption key is encrypted by a hash of the user code, the administrator code, or an administrator encryption key. Those skilled in the art will appreciate that there may be many ways to encrypt the user encryption key.

By encrypting the user encryption key, an administrator or third-party service may provide the correct administrator code to access the device but not be able to access or alter stored data. Encrypting the user key may increase the security of the stored data and avoid a single point of failure (e.g., a single master password for multiple secure storage devices). Those skilled in the art will appreciate that even if the administrator gains access to the master file system and the user encryption key, the administrator may still need the user code to decrypt the encryption key necessary to read the stored data.

In various embodiments, the user encryption key may be encrypted by an administrator encryption key. In one example, the user encryption key is encrypted by the administrator public encryption key (using RSA public key pairs). The user encryption key may be decrypted by the administrator private encryption key. For example, the administrator may retrieve the user encryption key from the user file system in the locked secure storage device 100. The administrator may decrypt the encrypted user encryption key with the administrator private encryption key. Once the administrator decrypts the user encryption key, the administrator may retrieve and decrypt the user's data within the locked secure storage device 100. The administrator may also be able to recover the user code. Those skilled the art will appreciate that the user encryption key may be decrypted by any number of methods which may grant the administrator full or limited access to the user code and/or data stored within the locked secure storage device 100.

In step 340, the administrator resets a lockout parameter of the locked secure storage device 100. In various embodiments, the administrator transmits a command to the locked secure storage device 100 to reset a lockout parameter. A lockout parameter is any parameter that may unlock the locked secure storage device 100 or otherwise provide access.

A lockout parameter may comprise a maximum number of allowed consecutive user code attempts, a number of consecutive user code attempts, or a stored user code. In one example, the secure storage device 100 may have a maximum number of allowed consecutive user code attempts (e.g., the maximum number of allowed consecutive user code attempts is ten). By increasing the maximum user code attempts, the secure storage device 100 may unlock thereby allowing at least one more user code attempt before re-locking.

In another example, the administrator may transmit a command to reset the number of consecutive user code attempts. When the number of consecutive user code attempts is equal to the maximum number of allowed consecutive user code attempts, the secure storage device 100 may lock. Upon receiving the appropriate command from the administrator, the secure storage device 100 may reset the number of consecutive user code attempts to any number (e.g., zero) which may unlock the secure storage device 100.

In various embodiments, the secure storage device 100 may comprise a plurality of file systems corresponding to a plurality of partitions. Each file system may comprise a separate user code and a separate number of allowed consecutive user code attempts. Although the number of user code attempts for one partition and file system may be equal to the maximum number of allowed consecutive user code attempts (as a result, locking that partition), the number of user code attempts for another partition with another file system may remain unlocked. One user code may be locked out while the secure storage device 100 may still receive and authenticate one or more other user codes. As a result, the partition associated with the locked user code may be inaccessible while another partition associated with an unlocked user code may be accessible.

In another example, the administrator may command the secure storage device 100 to store a new user code. The new user code may be either generated by the secure storage device 100 or received from the administrator. In various embodiments, the administrator can request that the secure storage device 100 store a new user code. When a new user code is created, the secure storage device 100 may either replace an old user code or associate the new user code with an existing or new user file system.

When the secure storage device 100 replaces an existing user code with a new user code, the user may not have access to previously stored data but can store new data within the user file system. In one example, data previously stored within the secure storage device 100 may be encrypted by an encrypted user encryption key which is encrypted by a hash of the original user code. Although the encrypted user encryption key may be accessible, it may not be decrypted unless there is access to the old user code. By replacing the old user code with a new user code, the user may not be able to decrypt the previously stored data. However, a new user encryption key that is encrypted by the new user code may be created. The new user encryption key may then be used to encrypt new data to be stored in the secure storage device 100.

In another example, the secure storage device 100 may generate a new user file system or associate an unused user file system with the new user code. As previously discussed, the data that was stored under the previous user code may not be accessible (i.e., the older user code remains locked), but the secure storage device 100 may allow access to the new user code and store new data. In other embodiments, the secure storage device 100 may replace the old user code with a new user code and allow access to previously stored user data.

In other embodiments, the secure storage device 100 may replace the old user code with the new user code and allow a user access to the previously stored data. In one example, the administrator code may decrypt the user encryption key which then may be associated or encrypted by the new user code thereby granting access of the stored data to the user with the new code.

It will be appreciated by those skilled in the art that the administrator may command the locked secure storage device 100 to reset any number of lockout parameters. In one example, upon receiving the appropriate instruction, the secure storage device 100 may reset the number of consecutive user code attempts in order to unlock the device and store a new user code. In another example, the secure storage device 100 may unlock two or more file systems by resetting the number of consecutive user code attempts for the appropriate file system.

Figure 4:
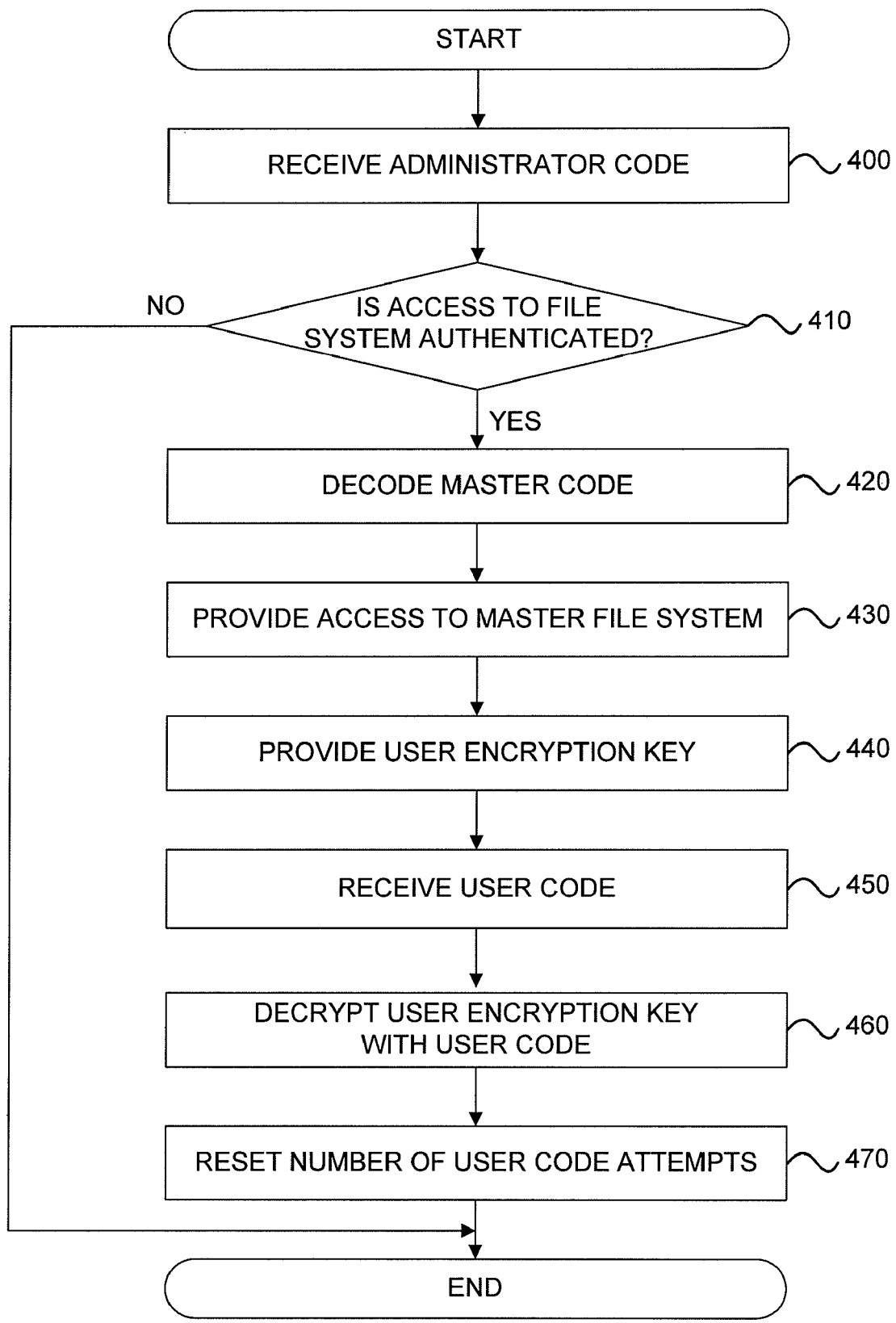
FIG. 4 is a flow chart for the recovery of data access for a locked secure storage device, in accordance with another embodiment of the present invention.

FIG. 4 is a flow chart for the recovery of data access for a locked secure storage device 100, in accordance with another embodiment of the present invention. In step 400, the authorization module 220 receives the administrator code. In step 410, the authorization module 220 authenticates the administrator code to determine if access to a user file system is authorized. In various embodiments, the authorization module 220 may decrypt the administrator code. In one example, an administrator encryption key is stored within the keystore module 210 by the administrator. In other embodiments, the administrator receives an encryption key from the secure storage device 100 (e.g., upon provisioning) and uses the encryption key to encrypt or digitally sign the administrator code. The authorization module 220 may decrypt the administrator code as a part of the authentication procedure. If the administrator code is not authenticated, the locked secure storage device 100 may refuse access.

If the administrator code is authenticated, the authorization module 220 decodes the master code. In some embodiments, the master code is encrypted. The master code can be encrypted by an administrator code, user code, or other master decryption key. In one example, the authorization module 220 decrypts the master code with the administrator code or a hash of the administrator code. In other embodiments, the administrator provides an administrator encryption key or master encryption key necessary to decrypt the master code.

Once the master code is decoded, the authorization module 220, the device controller 200, and/or the file system 230 may provide access to the master file system in step 430. By accessing the master file system, the administrator gains access to all file systems within the file system 230.

In step 440, the authorization module 220 provides the user encryption key from the file system 230 to the administrator. In one example, the administrator transmits a command to the locked secure storage device 100 to identify a particular file system or user to select the appropriate user encryption key. In another example, there is only one user file system and one user encryption key within the locked secure storage device 100. Upon authentication of the administrator code, the user encryption key is provided to the administrator.

In step 440, the authorization module 220 receives the user code from the administrator. The authorization module 220 may decrypt the user encryption key with the user code in step 450. In one example, the administrator provides the user code to the locked secure storage device 100. In another example, the user code may be stored within the secure storage device 100 (e.g., in the master file system). However, the user code may be encrypted. For example, the user code may be encrypted by the administrator public encryption key. In various embodiments, the user code may be decrypted by the administrator private encryption key, the administrator public encryption key, the master code, or a master encryption key. Those skilled in the art will appreciate that there are many different keys that may be used to encrypt the user code. As a result of decrypting the user encryption key in step 450, the administrator can access the data contained within the locked secure storage device 100.

In step 450, the authorization module 220 resets the number of user code attempts to unlock the locked secure storage device 100. In some embodiments, when the administrator code is authenticated, the locked secure storage device 100 is unlocked without further commands from the administrator. In one example, when the administrator code is authenticated, the authorization module 220 resets the number of user code attempts to zero. In other embodiments, the locked secure storage device 100 will unlock once the administrator code is authenticated and the correct user code is provided.

Figure 5:
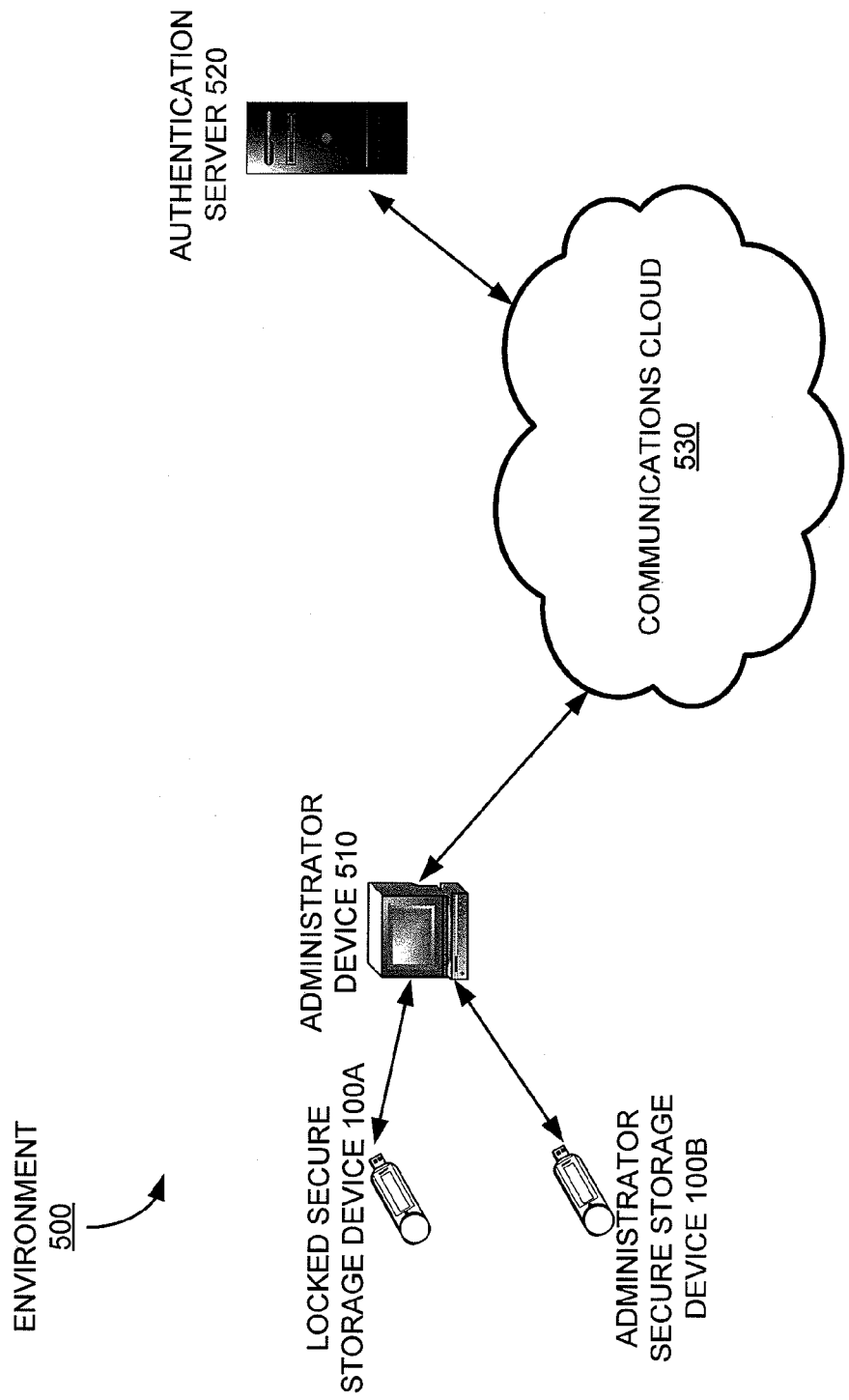
FIG. 5 depicts an environment for recovery of data access for a locked secure storage device over a network, in accordance with one embodiment of the present invention.

FIG. 5 depicts an environment 500 for recovery of data access for a locked secure storage device 100A over a network, in accordance with one embodiment of the present invention. An administrator device 510 and an authentication server 520 are coupled to a communications cloud 530. The administrator device 510 and the authentication server 520 may each comprise a digital device. The locked secure storage device 100A and an optional administrator secure storage device 100B may be operatively coupled to the administrator device 510.

The communications cloud 530 couples the digital devices together to allow the digital devices to communicate and transmit network data to each other. The communications cloud 530 may be a single device or multiple devices. In one embodiment, the communications cloud 530 is a router that routes data to a limited number of digital devices. In another embodiment, the communications cloud 530 comprises multiple routers, bridges, and hubs that couple a large number of digital devices. A communications cloud 530 may also be another network, such as the Internet, that allows digital devices to communicate and transmit data to each other.

Depending upon the topology of the environment 500, the communications cloud 530 is optional. For example, the environment 500 may illustrate the digital devices coupled in a ring topology. In a ring topology, each digital device may communicate directly to one or two digital devices within the environment 500 without the requirement of a communications cloud 530.

The optional administrator secure storage device 100B is a secure storage device that comprises an administrator code. The locked secure storage device 100A is a secure storage device which has locked one or more user codes from entering the device.

In exemplary embodiments, a user (e.g., an administrator) couples the administrator secure storage device 100B and the locked secure storage device 100A with the administrator device 510. The user may access the authentication server 520 (e.g., as a webserver) over the communications cloud 530. The authentication server 520 may comprise a secure storage device recovery software or firmware. The secure storage device recovery software or firmware is configured, upon authentication of an administrator code and decoding of the master code, to recover data from the locked secure storage device, recover one or more user codes from the locked secure storage device, or reset the lockout parameters of the locked secure storage device.

Figure 6:
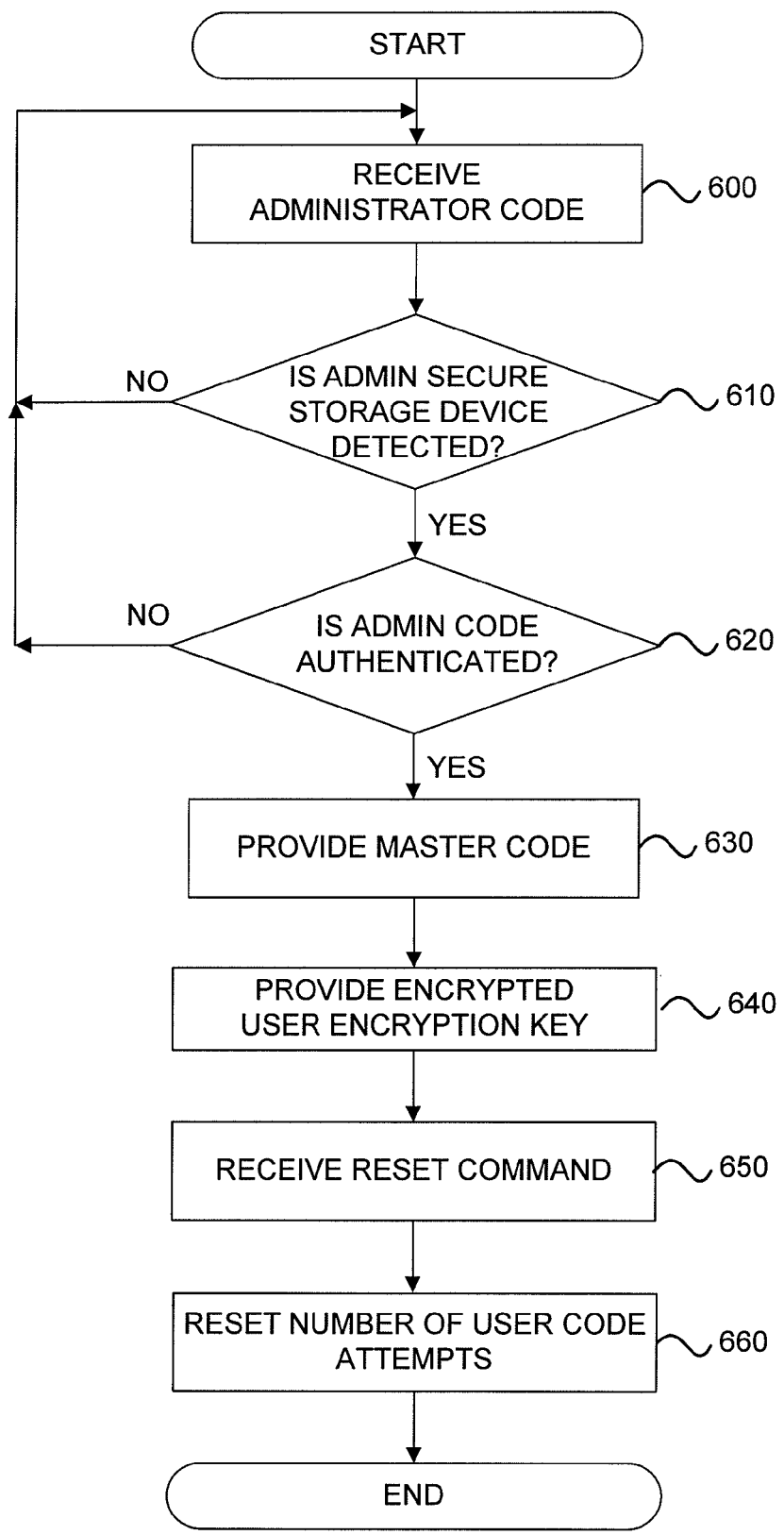
FIG. 6 is another flow chart for recovery of data access for a locked secure storage device over a network, in accordance with one embodiment of the present invention.

FIG. 6 is another flow chart for recovery of data access for a locked secure storage device 100A over a network, in accordance with one embodiment of the present invention. In step 600, the authentication server 520 receives an administrator code. In one example, a user such as an administrator couples a locked secure storage device 100A and an administrator secure storage device 100B to an administrator device 510. The user then accesses the authentication server 520 and submits an administrator code.

In step 610, the authentication server 520 detects the administrator secure storage device 100B. In one example, the authentication server 520 transmits a command to the administrator device 510 to detect the administrator secure storage device 100B or may transmit commands directly to the administrator secure storage device 100B. In another example, the administrator device 510 comprises recovery software configured to transmit a file or identifier from the administrator secure storage device 100B to the authentication server 520. Those skilled in the art will appreciate that there may be many ways that the authentication server 520 may detect and authenticate the administrator secure storage device 100B.

If the administrator secure storage device 100B is detected and authenticated, the authentication server 520 may authenticate or verify the administrator code in step 620. The authentication server 520 may verify that the administrator code is associated with the administrator secure storage device 100B. In one example, each administrator secure storage device 100B is associated with one or more administrator codes and one or more secure storage devices. The associations, administrator codes, and any encryption keys may be stored by the authentication server 520. In some embodiments, the administrator provides secure storage device identifiers, user codes, administrator codes, and/or encryption keys to the authentication server 520 for storage and safety. Alternately, the relationships as well as the user codes, administrator codes, and/or encryption keys may be stored in the authentication server 520 during manufacture of the secure storage device.

In step 630, the authentication server 520 provides the master code to the locked secure storage device 100A. In one example, the authentication server 520 securely stores the master code until the administrator secure storage device 100B is detected and the administrator code is authenticated. Subsequently, the master code may be retrieved and/or decrypted and transmitted to the locked secure storage device 100B. In another example, the authentication server 520 may provide an authentication signal to the locked secure storage device 100B to decode the master code stored within the locked secure storage device 100B in order to access the master file system.

In step 640, the authentication server 520 may provide a user one or more user encryption keys associated with the administrator code, the detected administrator secure storage device 100B, and/or the locked secure storage device 100A. In other embodiments, the authentication server 520 may provide the user one or more user encryption keys and/or one or more user codes. The authentication server 520 may also transmit a command to the locked secure storage device to transfer data (e.g., encrypted data) to the authentication server 520, the administrator device 510, or the administrator secure storage device 100B. In one example, the authentication server 520 transmits a signal to the locked secure storage device 100B to retrieve a user encryption key from the master file system. The user encryption key may be provided directly to the administrator device 510 or routed through the authentication server 520 for further processing (e.g., decryption).

In step 650, the authentication server 520 receives a reset command. In step 650, the authentication server 520 may reset the number of user code attempts for a file system within the locked secure storage device 100A to unlock the device. In other embodiments, the authentication server 520 may reset a maximum number of allowed consecutive user code attempts, a number of consecutive user code attempts, or a stored user code.

Alternately, the authentication server 520 may refuse access if the administrator secure storage device 100B is not detected, the administrator secure storage device 100B is not authenticated, or the administrator code is not verified. In some embodiments, the authentication server 520 may register the attempt as failed and optionally lock out the administrator code (i.e., refuse to accept the administrator code regardless of authenticity). In some embodiments, the user may be required to contact the operator of the authentication server 520 to reset the lockout of the administrator code.

Although FIG. 6 discloses a system whereby the administrator secure storage device 100B is detected and authenticated, the administrator secure storage device 100B is optional. In one example, the authentication server 520 may receive and authenticate the administrator code. Once the administrator code is authenticated, then the authentication server 520 may receive one or more reset commands to reset one or more lockout parameters and/or retrieve stored data from the locked secure storage device 100A.

Figure 7:
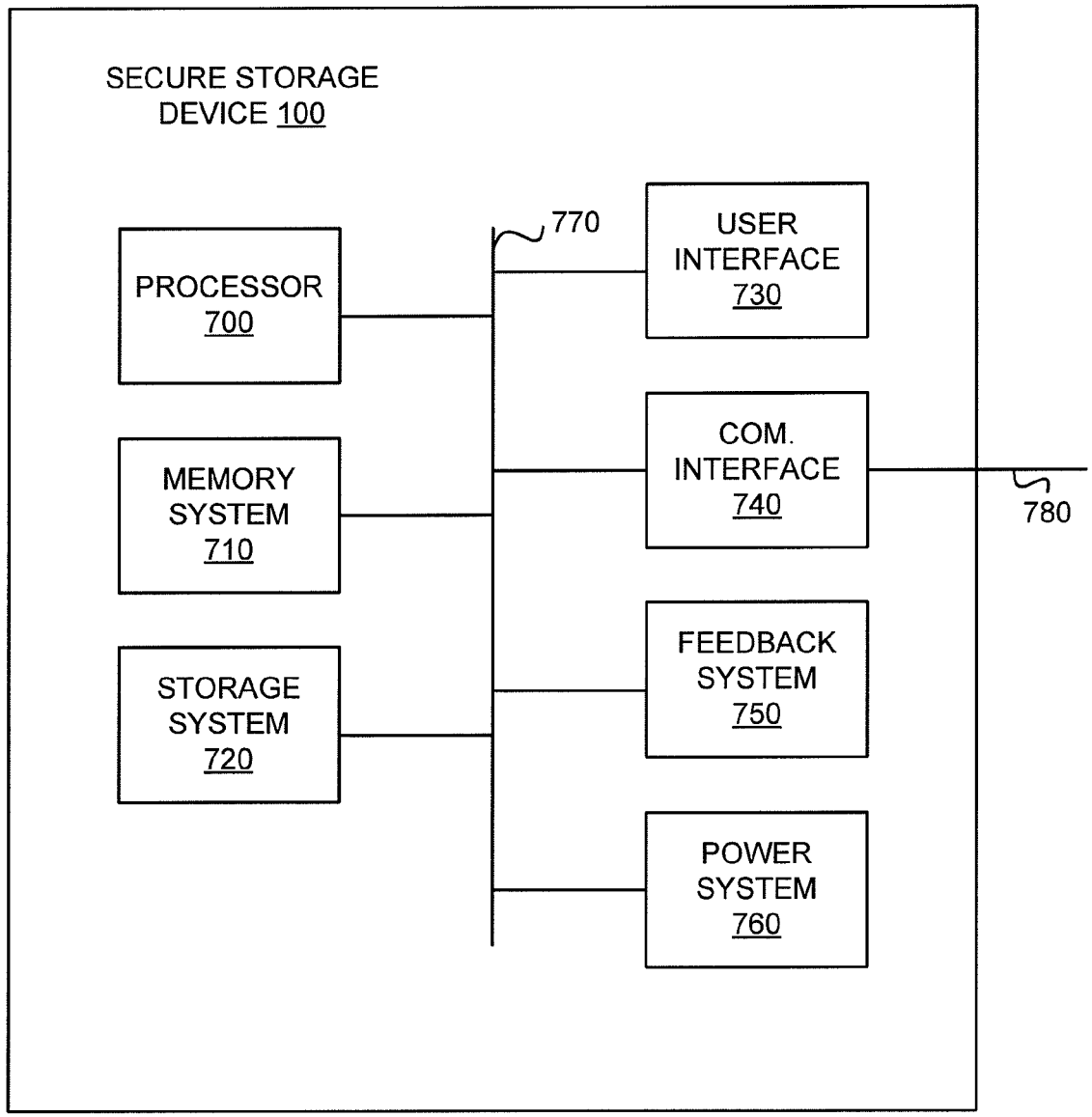
FIG. 7 depicts a secure storage device, in accordance with one embodiment of the present invention.

FIG. 7 depicts a secure storage device 100, in accordance with one embodiment of the present invention. The secure storage device 100 comprises a processor 700, a memory system 710, a storage system 720, a user interface 730, a communication interface 740, feedback system 750, and a power system 760 which are all coupled to a system bus 770. The processor 700 is configured to execute executable instructions (e.g., programs). In some embodiments, the processor 700 comprises circuitry or any processor capable of processing the executable instructions.

The memory system 710 is any memory configured to store data. Some examples of the memory system 710 are storage devices, such as RAM or ROM. The memory system 710 can comprise the ram cache. In various embodiments, data is stored within the memory system 710. The data within the memory system 710 may be cleared or ultimately transferred to the storage system 720.

The storage system 720 is any storage configured to retrieve and store data. Some examples of the storage system 720 are flash drives, hard drives, optical drives, and/or magnetic tape. The storage system 720 can comprise a database 260 (FIG. 2) or other data structure configured to hold and organize data. In some embodiments, the secure storage device 100 includes a memory system 710 in the form of RAM and a storage system 720 in the form of flash data. Both the memory system 710 and the storage system 720 comprise computer readable medium which may store instructions or programs that are executable by a computer processor including the processor 700.

The user interface 730 is any device that can receive a user code. The user interface 730 can be, but is not limited to, a user input dial 120 (FIG. 1), keypad, or biosensor.

The communication interface 740 can be coupled to any digital device via the link 780. As discussed in FIG. 1, the communication interface 740 may support communication over a USB connection, a firewire connection, an Ethernet connection, a serial connection, a parallel connection, or an ATA connection. The communication interface 740 may also support wireless communication (e.g., 802.11 a/b/g/n or wireless USB). It will be apparent to those skilled in the art that the communication interface 740 can support many wired and wireless standards.

The feedback system 750 is any indicator that signals the user that access to the stored data within the secure storage device 100 is authorized. In some examples, the feedback system 750 can be an LED light or sound. The feedback system 750 may also comprise circuitry to display messages on the display 130 (e.g., access to a partition is authorized) The feedback system 750 may also indicate that access to the stored data is not authorized or that the secure storage device 100 is locked.

The optional power system 760 is any system that can provide power to the secure storage device 100. The power system 760 can supply power to the secure storage device 100 to receive the user code and authorize access to the stored data. In one example, the power system 760 comprises a rechargeable battery, a replaceable battery, or a capacitor. The batteries or capacitor may be recharged with a power recharger or from power received from the digital device. In some embodiments, the power system 760 is optional, and the user code can be passively received. Once the secure storage device 100 is coupled to the digital device, power can be received from the digital device and the authorization process completed.

In some embodiments, the power system 760 supplies power to the processor 700 when the secure storage device 100 is not coupled to a digital device. In one example, the power system 760 supplies power to the processor 700 during the process of receiving the user code and authorization. Once the secure storage device 100 is coupled to the digital device, the digital device may supply power to the secure storage device 100.

Although many of the embodiments discussed herein discuss a secure storage device 100, the embodiments may be used with any portable and/or removable storage device, including, but not limited to portable flash storage device, a USB storage device, secure storage device, or portable hard drive. In one example, a USB storage device comprises a ram cache configured to receive and store temporary files until a predetermined event upon which the temporary files may be stored within the storage system 720. Those skilled in the art will appreciate that any detachable storage device may be used with embodiments of the claimed invention.

The above-described functions can be comprised of executable instructions that are stored on data storage medium. The executable instructions can be executed by the processor 700. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

What is claimed is:

1. A system for recovery of data access of a locked secure Universal Serial Bus (USB) storage device, the system comprising:
   a secure USB storage device, the secure USB storage device being locked so as to no longer accept any user code, the secure USB storage device comprising:
   a keystore module configured to allow access to a master file system comprising a user encryption key for data stored within the locked secure USB storage device based on a master code; and
   an authorization module configured to receive an administrator code, authenticate the administrator code, decode the master code, and reset a lockout parameter of the locked secure USB storage device, thereby permitting acceptance of a user code.

2. The system of claim 1, wherein the locked secure USB storage device comprises a locked detachable secure USB storage device.

3. The system of claim 1, wherein the locked secure USB storage device comprises the master file system.

4. The system of claim 1, wherein the locked secure USB storage device further comprises a user file system.

5. The system of claim 1, wherein the authorization module is further configured to receive a user code and decrypt the user encryption key using the user code.

6. The system of claim 1, wherein authenticating the administrator code comprises the authorization module configured to detect an administrator secure USB storage device.

7. The system of claim 6, wherein the authorization module is further configured to verify the administrator code.

8. The system of claim 1, wherein resetting the lockout parameter comprises the authorization module configured to reset a number of consecutive user code attempts.

9. The system of claim 1, wherein resetting the lockout parameter comprises the authorization module configured to receive a new user code from the administrator.

10. The system of claim 1, wherein resetting the lockout parameter comprises the authorization module configured to provide a user encryption key to an administrator.

11. The system of claim 10, wherein the user encryption key is encrypted by a user code.

12. The system of claim 10, wherein the user encryption key is encrypted by an administrator encryption key.

13. The system of claim 1, wherein resetting the lockout parameter comprises the authorization module configured to provide a master encryption key for the locked secure USB storage device to an administrator based on the master code.

14. The system of claim 1, wherein the locked secure USB storage device is in a locked state due to the receipt of an incorrect user code a predetermined number of times, and the locked secure USB storage device cannot be unlocked by receipt of a correct user code.

15. A method for recovery of data access of a secure Universal Serial Bus (USB) storage device, the secure USB storage device being locked so as to no longer accept any user code, the method comprising:
   receiving an administrator code;
   authenticating the administrator code;
   decoding a master code;
   providing access to a master file system comprising a user encryption key for data stored within the locked secure USB storage device based on the master code; and
   resetting a lockout parameter of the locked secure USB storage device, thereby permitting acceptance of a user code.

16. The method of claim 15, wherein the locked secure USB storage device comprises a locked detachable secure USB storage device.

17. The method of claim 15, wherein the locked secure USB storage device comprises the master code.

18. The method of claim 15, wherein the locked secure USB storage device further comprises a user file system.

19. The method of claim 15, further comprising:
   receiving a user code; and
   decrypting the user encryption key using the user code.

20. The method of claim 15, wherein authenticating the administrator code comprises detecting an administrator secure USB storage device.

21. The method of claim 20, further comprising verifying the administrator code.

22. The method of claim 15, wherein resetting the lockout parameter of the locked secure USB storage device comprises resetting a number of consecutive user code attempts.

23. The method of claim 15, wherein resetting the lockout parameter comprises receiving a new user code from the administrator.

24. The method of claim 15, wherein resetting the lockout parameter of the locked secure USB storage device comprises providing the user encryption key to an administrator.

25. The method of claim 24, wherein the user encryption key is encrypted by a user code.

26. The method of claim 24, wherein the user encryption key is encrypted by an administrator encryption key.

27. The method of claim 15, wherein resetting the lockout parameter comprises providing a master encryption key for the locked secure USB storage device to an administrator based on the master code.

28. A computer readable non-transitory storage medium having embodied thereon a program, the program being executable by a processor for performing a method for recovery of data access of a secure Universal Serial Bus (USB) storage device, the secure USB storage device being locked so as to no longer accept any user code, the method comprising:
   receiving an administrator code;
   authenticating the administrator code;
   decoding a master code;
   providing access to a master file system comprising a user encryption key for data stored within the locked secure USB storage device based on the master code; and
   resetting a lockout parameter of the locked secure storage device, thereby permitting acceptance of a user code.

* * * * *